US008641089B2

(12) United States Patent
Friedrich et al.

(10) Patent No.: US 8,641,089 B2
(45) Date of Patent: Feb. 4, 2014

(54) AIRBAG MODULE FOR A VEHICLE STEERING WHEEL

(71) Applicant: TRW Automotive Safety Systems GmbH, Aschaffenburg (DE)

(72) Inventors: Stefan Friedrich, Aschaffenburg (DE); Klaus Freudenberger, Aschaffenburg (DE); Michael Deckenhoff, Duelmen (DE); Dirk Zimmermann, Muehldorf a. Inn (DE); Ralf Krause, Bad Emstal (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 0 days.

(21) Appl. No.: 13/792,260

(22) Filed: Mar. 11, 2013

(65) Prior Publication Data

US 2013/0241181 A1    Sep. 19, 2013

(51) Int. Cl.
*B60R 21/16*    (2006.01)
(52) U.S. Cl.
USPC .......................................... 280/731; 280/741

(58) Field of Classification Search
USPC ................................................... 280/731, 741
See application file for complete search history.

(56) References Cited

U.S. PATENT DOCUMENTS

| 6,354,622 | B1 * | 3/2002 | Ulbrich et al. ................. 280/731 |
| 6,712,383 | B2 * | 3/2004 | Asic et al. ................... 280/728.2 |
| 6,736,423 | B2 * | 5/2004 | Simonian et al. ............. 280/731 |
| 2002/0140212 | A1 * | 10/2002 | Hauer ............................ 280/731 |
| 2009/0218739 | A1 | 9/2009 | Terada et al. |
| 2013/0221641 | A1 * | 8/2013 | Kondo et al. .................. 280/731 |

FOREIGN PATENT DOCUMENTS

DE    10215330    4/2003

* cited by examiner

*Primary Examiner* — Toan To
(74) *Attorney, Agent, or Firm* — Tarolli, Sundheim, Covell & Tummino LLP

(57) ABSTRACT

In an airbag module (100) for a vehicle steering wheel comprising an inflator (110) and a device (130) for vibration damping on which the inflator (110) is mounted to be oscillating as vibration damper mass the device (130) for vibration damping is configured at least to damp a first device-specific frequency and a second device-specific frequency, wherein different excitation directions are associated with the first and second device-specific frequencies.

10 Claims, 4 Drawing Sheets

AIRBAG MODULE FOR A VEHICLE STEERING WHEEL

BACKGROUND OF THE INVENTION

The present invention relates to an airbag module for a vehicle steering wheel, comprising an inflator and a device for vibration damping on which the inflator is mounted to be oscillating as vibration damper mass.

SUMMARY OF THE INVENTION

From the state of the art an airbag module of this type for a vehicle steering wheel is known in which the inflator is mounted to be oscillating via the device for vibration damping in a plane predetermined by the same. The airbag module thus can serve at least partially as vibration damper and can be applied for suppressing undesired vibrations generated by a corresponding vehicle chassis during operation and transmitted into the vehicle steering wheel. Upon occurrence of such vibrations the inflator acting as vibration damper mass can perform a movement relative to the vehicle steering wheel and thus damp oscillations generated by the vibrations in an excitation direction located in the predetermined plane.

However, the device for vibration damping of such airbag module has only a restricted efficiency during vibration damping, as merely vibrations of excitation directions can be damped hereby that are located in the predetermined plane. Moreover only vibrations can be damped the frequencies of which are within a comparatively restricted frequency range around an associated resonance frequency. Frequencies of vibrations having excitation directions which are not exactly located in the predetermined plane can only be damped by such device for vibration damping, however, when they are approximately within the range of the resonance frequency, wherein a maximum frequency spread of about 2 Hz can be compensated.

Therefore it is an object of the invention to provide a new airbag module comprising a device for vibration damping that exhibits improved efficiency.

This object is achieved by an airbag module for a vehicle steering wheel, comprising an inflator and a device for vibration damping on which the inflator is mounted to be oscillating as vibration damper mass. The device for vibration damping is preferably configured at least to damp a first device-specific frequency and a second device-specific frequency. Different excitation directions can be associated with the first and second device-specific frequencies.

Since the different excitation directions can be located both in the same plane and in different planes, the efficiency of the device for vibration damping can be easily improved. Since, moreover, the different device-specific frequencies can cover different frequency ranges, also a vibration damping of vibrations the associated frequencies of which have a frequency spread of more than 3 Hz can be realized.

The afore-described object is likewise achieved by an airbag module for a vehicle steering wheel, comprising an inflator and a device for vibration damping on which the inflator is mounted to be oscillating as vibration damper mass, the device for vibration damping including a first damping member by means of which the inflator is supported to be oscillating in a plane. Furthermore the device for vibration damping preferably includes at least one further damping member configured to damp a vibration of the inflator along a straight line extending in parallel to the plane.

Thus vibrations the excitation directions of which are located in planes arranged in parallel to each other can be safely and reliably damped. Hereby the efficiency of the device for vibration damping can be improved.

In accordance with an embodiment the device for vibration damping includes at least one damping member which is preferably configured to be annular. The inflator is preferably mounted to be oscillating on an inflator carrier of the airbag module by means of said first damping member. Preferably the first damping member is secured to a flange of the inflator, e.g. by form-closure and/or by means of vulcanization or crimping. The first damping member preferably includes a plurality of, e.g. four, six or more damping members. They are preferred to be axially aligned. The first damping member is preferably configured at least to damp a first device-specific frequency, especially in a first associated excitation direction, preferably in more or all radial excitation directions located in an associated excitation plane.

Thus a simple and robust first damping member can be provided which is safely and reliably secured to the inflator and by which at least vibrations having a first device-specific frequency can be damped in the radial direction of the inflator. Moreover, the first damping member is effective in the axial direction of the inflator so that it can safely and reliably prevent the inflator from abutting against the inflator carrier when vibrations occur so as to avoid possible damage of the inflator and the inflator carrier, respectively.

In accordance with an embodiment, the device for vibration damping includes at least one further damping member. The latter is preferably configured as damping ring and includes at least one radially aligned damping member. Preferably the further damping member is configured to be a damping ring having exactly two radially aligned damping members. In this case the two radially aligned damping members are preferably arranged at positions of the damping ring that are approximately diametrically opposed to each other.

By using said radially aligned damping members based on the first damping member additional push/pull elements are provided that are capable of damping vibrations which occur in a different plane than the vibrations damped by the first damping member. The vibration frequencies adapted to be damped in this way can be predetermined by specific configurations of the damping members as well as by the number thereof so as to enhance the efficiency of the device for vibration damping.

The damping ring is preferably secured to the outer circumference of the inflator, preferably by form-closure and/or vulcanization. The inflator is connected to be oscillating to a diffusor surrounding at least portions of the inflator preferably through the damping ring. Preferably the inflator is connected to the diffusor via at least one of the radially aligned damping members, in a preferred manner by form-closure and/or vulcanization.

Thus a robust and reliable damping ring can be provided which is secured to the inflator in a stable and safe manner and via the radially aligned damping members of which at least vibrations of the inflator extending in a plane spanned by the radially aligned damping members and the damping ring, respectively, can be damped. Moreover, the radially aligned damping members secured to the diffusor are effective in the radial direction of the inflator so that they can safely and reliably prevent the inflator from abutting against the diffusor when vibrations occur so as to avoid possible damage of the inflator and the diffusor, respectively.

In accordance with an embodiment, the damping ring is configured to damp at least a second device-specific frequency. Advantageously a second excitation direction can be associated with the latter. Said second excitation direction can be different from the afore-mentioned first excitation direction and is preferably located in a plane extending in parallel to the plane of the first excitation direction.

BRIEF DESCRIPTION OF THE DRAWINGS

Further details and advantageous developments of the invention are resulting from the embodiments described hereinafter and illustrated in the drawings which are by no means meant to restrict the invention.

DESCRIPTION OF PREFERRED EMBODIMENT

Figure 1:
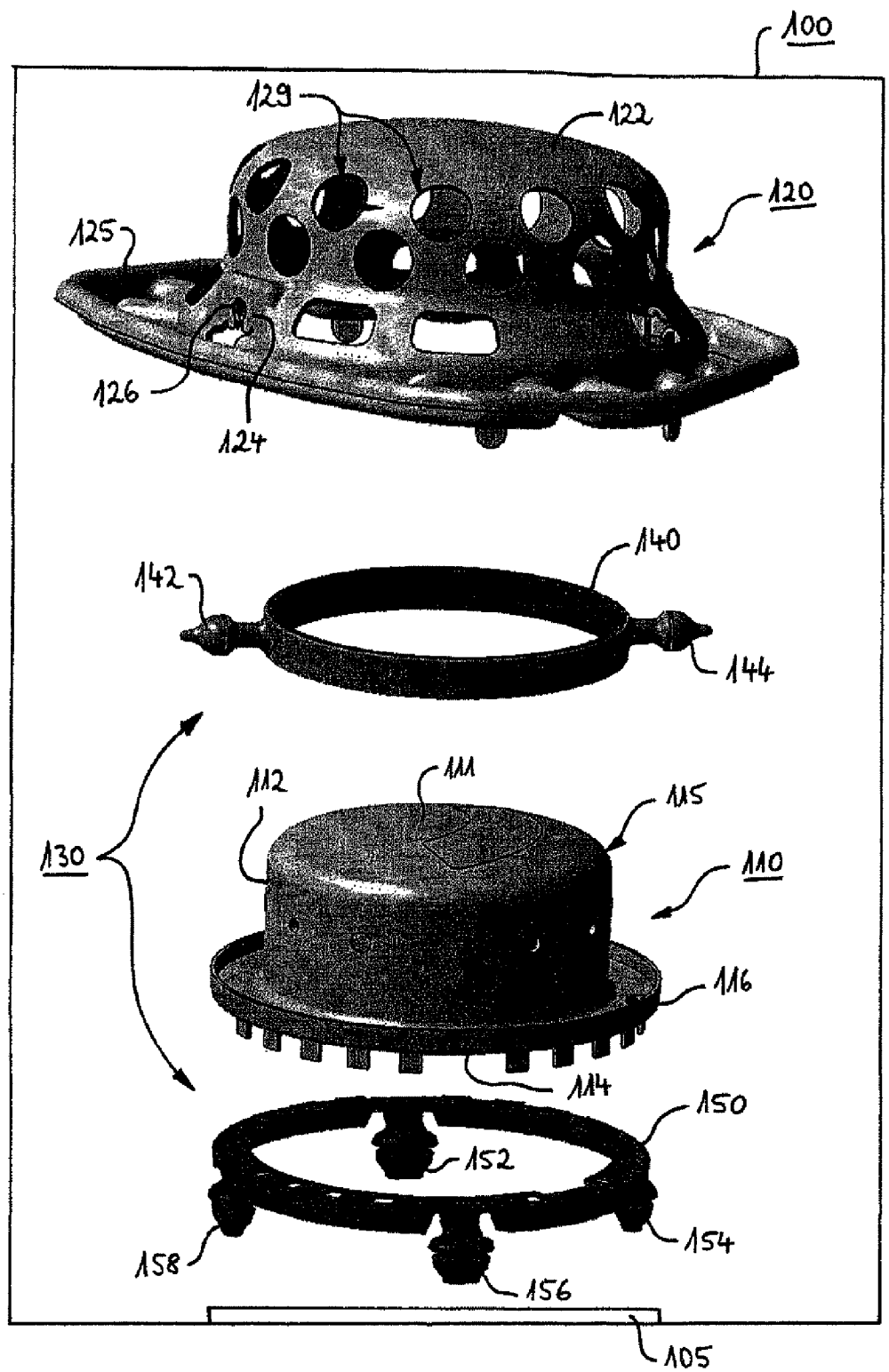
FIG. 1 shows a schematic, partly perspective view of an airbag module according to an embodiment.

In the following description the terms left, right, front, rear, top and bottom relate to the respective drawing figure and may vary in dependence on an appropriately selected alignment (portrait or landscape) from one drawing figure to the other. Equal or equally acting parts are denoted with the same reference numerals in different figures and are usually described only once.

FIG. 1 shows an exemplary airbag module 100 for a vehicle steering wheel according to an embodiment. The airbag module 100 illustrates an inflator carrier 105, an inflator 110, a diffusor 120 as well as a device 130 for vibration damping. However, it is pointed out that the airbag module 100 and the inflator carrier 105 are represented only schematically for the purpose of a simple and clear drawing, while the other components are shown in a perspective view.

The inflator 110 capable of being realized e.g. by an inflator known from the state of the art includes, by way of example, an inversed cup-shaped casing 115 having a bottom 111 which is transferred, via an outer circumference 112, into a flange-type extension 116, hereinafter also referred to as flange. The latter is formed at an axial end portion 114 of the casing 115 which in FIG. 1 forms a lower side of the inflator 110.

The diffusor 120 is illustrated to be hat-shaped and includes an inversed cup-shaped outer wall 122 whose downwardly open end in FIG. 1 is configured to have a flange-like extension 125 in the form of a hat brim. The diffusor 120 can substantially be in the form of a common diffusor known from the state of the art and can have a plurality of discharge orifices 129 only two orifices of which are marked by way of example in FIG. 1 for the purpose of simplifying the drawing. However, in contrast to a common diffusor, at the diffusor 120 at least one fastening device 124 provided with a fastening orifice 126 is formed. This fastening device 124 is provided at the outer wall 122 by way of illustration.

The device 130 for vibration damping is exemplified to have at least a first and a second damping member 150, 140 and, according to an embodiment, is configured at least to damp vibrations that may occur during operation of the airbag module 100 and may have a first device-specific frequency and a second device-specific frequency. Different excitation directions (442, 444 in FIG. 4) can be associated with the first and second device-specific frequencies as described below in FIG. 4. To enable this, the inflator 110 is mounted to be oscillating as vibration damper mass on the device 130 in order to damp vibrations, as described below concerning FIG. 3.

The first damping member 150 is exemplified to be configured in ring shape of an elastic material and includes a plurality of axially aligned damping members. At the first damping member 150 four damping members 152, 154, 156, 158 aligned in axial direction of the first damping member 150 are illustratively provided. It is pointed out, however, that the described number of damping members is not restricted to four, but also other numbers, e.g. three, five, six or more, are possible for example in dependence on a device-specific frequency to be damped and a desired stability of the first damping member 150.

The second damping member 140 is illustratively configured as damping ring. Said damping ring 140 by way of example includes at least one and preferably exactly two radially aligned damping members 142, 144. They are illustrated to be journal-shaped and arranged at approximately diametrically opposed positions of the damping ring 140 and there extend outwardly starting from the damping ring 140 viewed in the radial direction of the damping ring 140. Also in this case it is referred to the fact, however, that the described number of damping journals 142, 144 is not restricted to two, but also other numbers, e.g. three or more, are possible for example in dependence on a device-specific frequency to be damped. Moreover it is pointed out that the damping journals 142, 144 integrally formed with the damping ring 140 illustratively in the way of tension and compression members can also be configured as components separate from the damping ring 140 which are secured to the damping ring 140 e.g. by gluing or welding. In this way, also additional tension and compression members can be secured to the damping ring 140.

Figure 2:
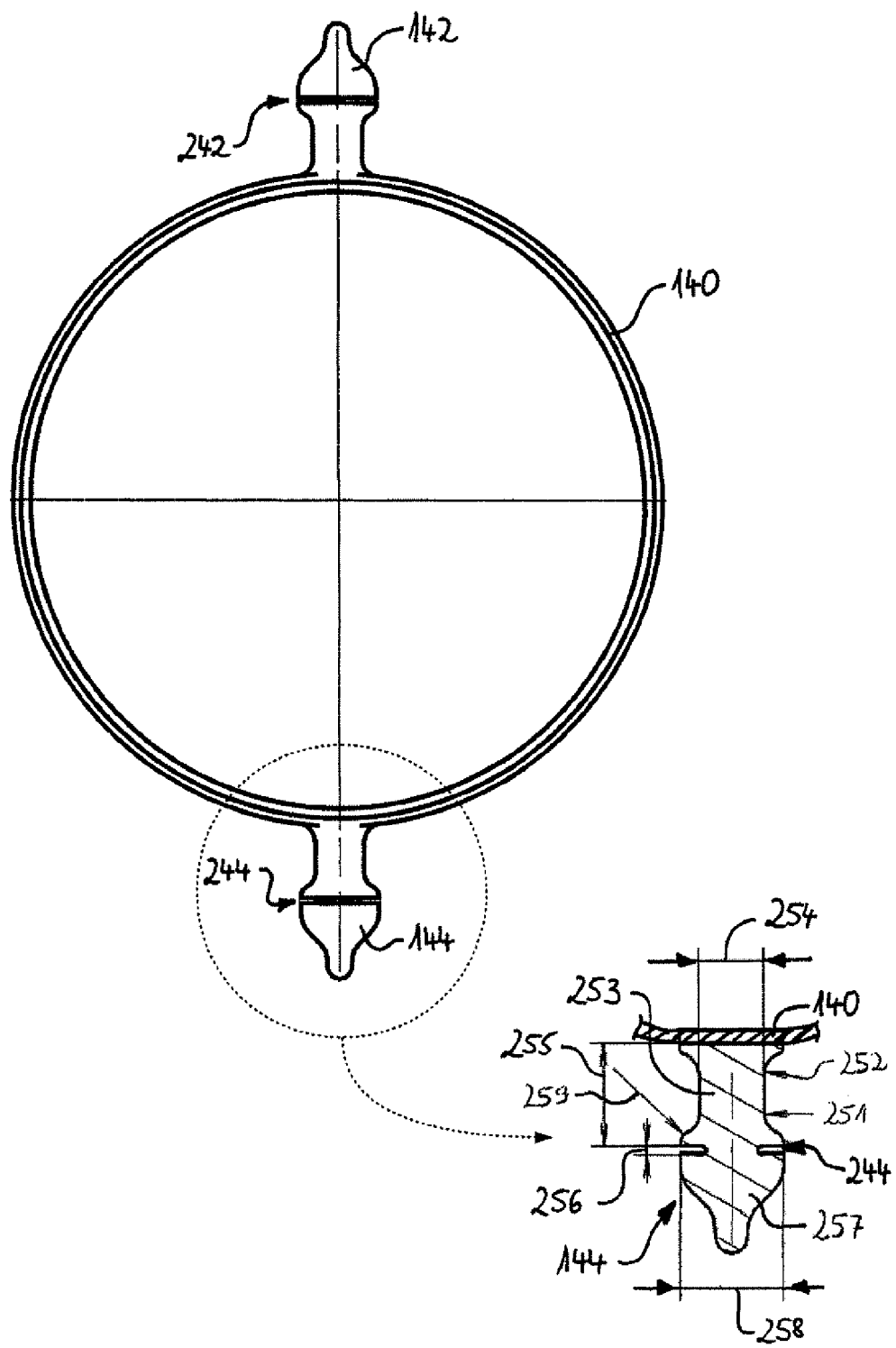
FIG. 2 shows a top view of the damping ring of FIG. 1 as well as an enlarged detailed view of a radially aligned damping member of said damping ring.

FIG. 2 illustrates the damping ring 140 of FIG. 1 including the damping journals 142, 144 that are arranged, as described in FIG. 1, at approximately diametrically opposed positions of the damping ring 140. The latter has e.g. a thickness of about 1.8 mm. The damping journal 142 illustratively includes an annular groove 242 and the damping journal 144 includes an annular groove 244.

An exemplary configuration of the damping journals 142, 144 is described hereinafter in detail by the example of the damping journal 144 having a diameter 258 of about 8 mm illustratively at its axial end secured to the damping ring 140. Starting from this axial end in a radially outwardly facing direction the damping journal 144 is tapered at a rounded shoulder 252 to a diameter 254 of about 5 mm so as to then extend at a rounded projection 251 to an area 259 having the diameter 258 of about 8 mm again. In this area 259 the annular groove 244 is formed which by way of example has a width 256 of about 0.7 mm. Between the damping ring 140 and the annular groove 244 the damping journal 144 has a length 255 of approx. 8 mm. Starting from the annular groove 244 up to the radially outwardly arranged axial end of the damping journal 144, the latter then is tapered into a tail-like area 257 having a length of e.g. less than 8 mm.

It is pointed out, however, that the afore-described dimensions and shapes of the damping journal 144 are merely of exemplary nature and are not meant to be a restriction of the invention. Rather, the invention can be applied with differently shaped damping journals, e.g. bolt-like damping journals having a uniform diameter etc.

Figure 3:
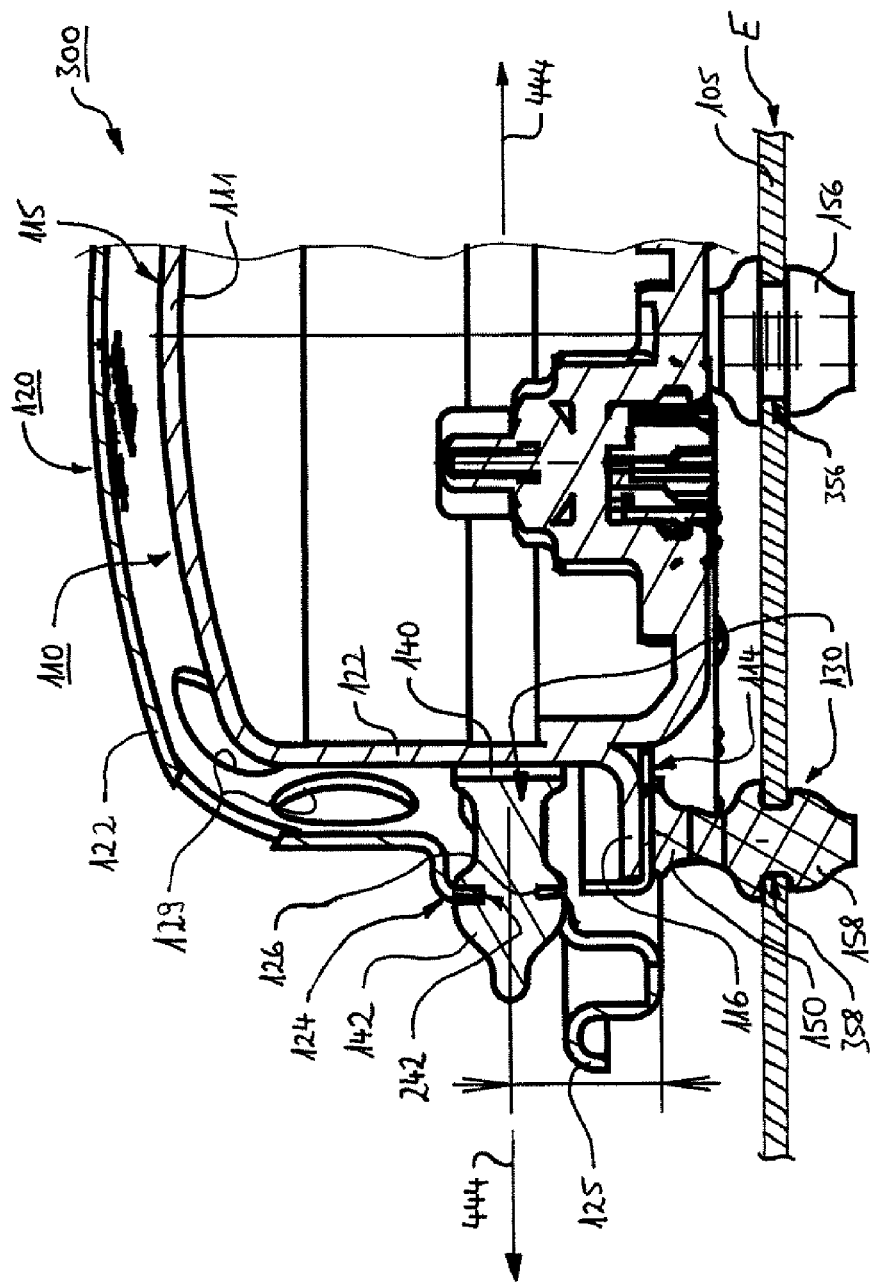
FIG. 3 shows a sectional view of a cut-out of the inflator of FIG. 1 secured to the inflator carrier of FIG. 1 including the diffusor of FIG. 1 secured thereto.

FIG. 3 shows an arrangement 300 comprising the inflator 110, the diffusor 120 and the device 130 for vibration damping as well as the inflator carrier 105 of FIG. 1 after exemplary assembly. The first damping member 150 is illustratively secured to the flange 116 of the inflator 110, e.g. by form-closure, vulcanization and/or crimping. The axially aligned damping members 156, 158 (as well as 152, 154 of FIG. 1) of the first damping member 150 are fixed to the inflator carrier 105 so that the inflator 110 is mounted to be oscillating on the inflator carrier 105 via the first damping member 150 in a plane E formed by the inflator carrier 105. For this, the axially aligned damping members 156, 158 illustratively pass through associated openings 356 and 358, respectively, at the inflator carrier 105.

The damping ring 140 is secured to the outer circumference 112 of the inflator 110, e.g. by form-closure and/or vulcanization. The damping journal 142 of the damping ring 140 is secured to the fastening device 124 of the diffusor 120, the damping journal 142 passing through the fastening orifice 126 and the outer wall 122 of the diffusor 120 engaging in the annular groove 242 of the damping journal 142. The damping journal 142 can be fixed in the fastening orifice 126 e.g. by form-closure and/or vulcanization.

Thus the inflator 110 is connected to the diffusor 120 at least via the radially aligned damping journal 142 and by way of illustration via the damping ring 140 and the damping journal 142. Preferably also the damping journal 144 of FIGS. 1 and 2 is secured to the diffusor 120 in a similar way, as well as optional tension and compression members which can also be configured in the way of the damping journals 142, 144. Thus the inflator 110 is mounted to be oscillating on the diffusor 120 via the damping ring 140, wherein by the radial alignment of the damping journals 142 (and 144 in FIGS. 1 and 2) the damping ring 140 is suited for damping a vibration of the inflator 110 along a straight line 444 extending in parallel to the plane E. The damping journals 142 (144 of FIGS. 1 and 2) are effective in the radial direction of the inflator 110.

Figure 4:
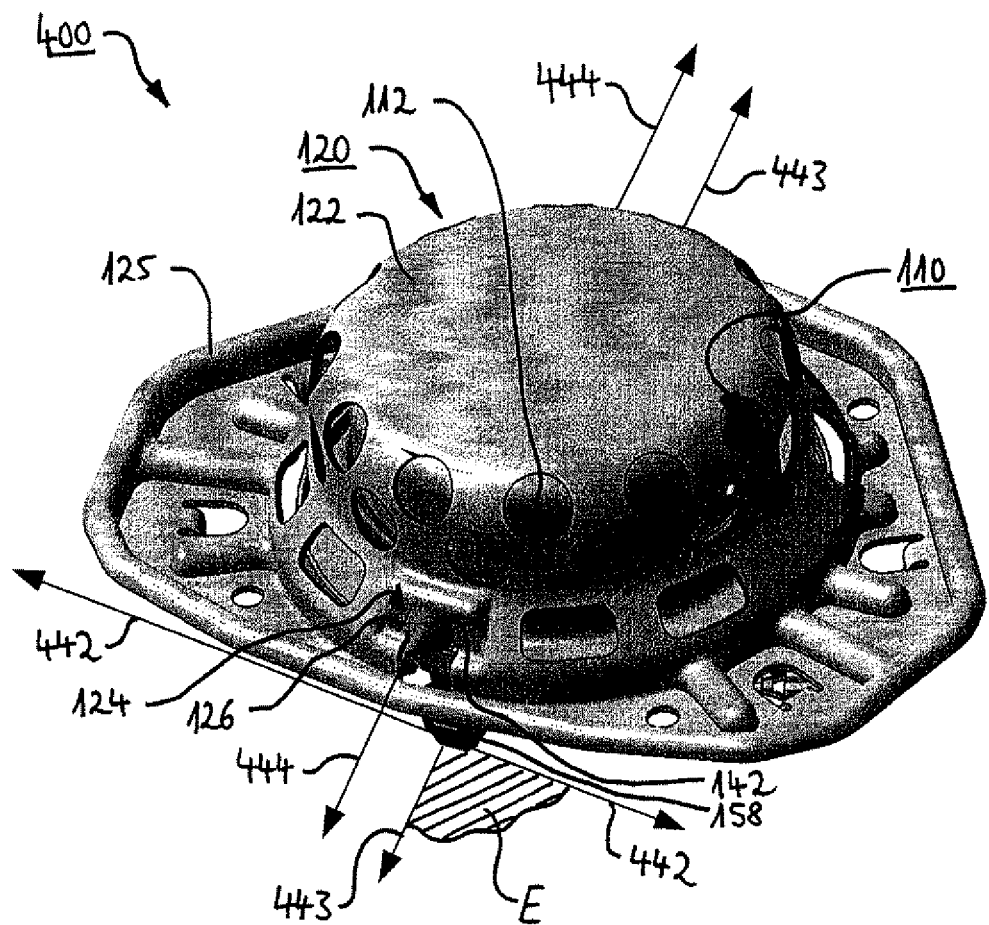
FIG. 4 shows a perspective view of the diffusor of FIG. 1 including the inflator of FIG. 1 secured thereto.

FIG. 4 shows an arrangement 400 substantially corresponding to the arrangement 300 of FIG. 3. However, for the purpose of simplifying the drawing a representation of the inflator carrier was dispensed with. Instead, merely portions of the plane E were shown in hatched lines.

FIG. 4 illustrates an exemplary functioning of the arrangement 400 in which the first damping member 150 is configured, as described above, at least to damp a first device-specific frequency associated with vibrations which illustratively have a first excitation direction 442 and 443, respectively. Preferably the first excitation direction represents several or all radial excitation directions located in the plane E. The damping ring 140 is configured at least to damp a second device-specific frequency associated with vibrations which illustratively have an excitation direction marked by the straight line 444 that, by way of example, is located in parallel to the plane E as described in FIG. 3.

In other words, the invention relates to a device for vibration damping (mass damper) adapted to damp different vibrating frequencies by an appropriate arrangement of individual damping elements. These vibration frequencies are located in the steering wheel rim plane (or a plane parallel thereto) the effects of which are located in different directions. The invention allows changing the effective directions of the mass damper by varying the arrangement of the damping elements. The angle between the two effective directions can be optionally adjusted.

Due to the different load of the damping elements (shear and tension/compression) in the different effective directions of the mass damper, the damping elements have rigidity dependent on the direction and, as a result, the mass damper has a different resonance frequency in at least two directions.

By varying the rigidities of the damping elements the distance of the at least two resonance frequencies from each other can be adjusted (spread of the frequencies).

In addition, the spread of the frequencies can be increased by the tension-loaded elements having different shear rigidities in the different directions (e.g. by oval or rectangular cross-sections of the damping elements).

The spread of the frequencies can also be achieved solely by the different shear rigidities of the damping elements in different directions (e.g. oval or rectangular cross-sections of the damping elements).

As a matter of course, plural changes and modifications are possible within the scope of the present invention.

The invention claimed is:

1. An airbag module (100) for a vehicle steering wheel, comprising an inflator (110) and a device (130) for vibration damping on which the inflator (110) is mounted to be oscillating as vibration damper mass, wherein the device (130) for vibration damping is configured at least to damp a first device-specific frequency and a second device-specific frequency, wherein different excitation directions (442, 444) are associated with the first and second device-specific frequencies.

2. An airbag module (100) for a vehicle steering wheel, comprising an inflator (110) and a device (130) for vibration damping on which the inflator (110) is mounted to be oscillating as vibration damper mass, wherein the device (130) for vibration damping includes a first damping member (150) by means of which the inflator (110) is mounted to be oscillating in a plane (E) and includes at least one further damping member (140) configured to damp a vibration of the inflator (110) along a straight line (444) extending in parallel to the plane (E).

3. The airbag module according to claim 1, wherein the device (130) for vibration damping has at least one, especially annularly formed first damping member (150) by means of which the inflator (110) is mounted to be oscillating on an inflator carrier (105) of the airbag module (100), the first damping member (150) being preferably secured to a flange (116) of the inflator (110), especially by form-closure, preferably by means of vulcanization or crimping.

4. The airbag module according to claim 1, wherein the first damping member (150) has a plurality of, preferably at least four or six, especially axially aligned damping members (152, 154, 156, 158).

5. The airbag module according to claim 1, wherein the first damping member (150) is configured at least to damp a first device-specific frequency, especially in a first associated excitation direction (442), preferably in several or all radial excitation directions.

6. The airbag module according to claim 1 wherein the device (130) for vibration damping includes at least one further damping member (140) especially configured as damping ring comprising at least one, especially comprising exactly two radially aligned damping members (142, 144), the two radially aligned damping members (142, 144) being preferably arranged at opposed positions of the damping ring (140).

7. The airbag module according to claim 1, wherein the damping ring (140) is secured to the outer circumference (112) of the inflator (110), the damping ring (140) being preferably secured to the inflator (110) by form-closure and/or vulcanization.

8. The airbag module according to claim 1, comprising a diffusor (120) surrounding at least portions of the inflator (110), wherein the inflator (110) is connected to be oscillating to the diffusor (120) via the damping ring (140).

9. The airbag module according to claim 6, wherein the inflator (110) is connected to the diffusor (120), preferably by form-closure and/or vulcanization, via at least one of the radially aligned damping members (142, 144).

10. The airbag module according to claim 1, wherein the damping ring (140) is configured at least to damp a second device-specific frequency, especially in a second associated excitation direction (444).

\* \* \* \* \*